(12) United States Patent
Hirano et al.

(10) Patent No.: US 10,924,373 B2
(45) Date of Patent: Feb. 16, 2021

(54) OPTICAL LINE TERMINAL OF OPTICAL NETWORK AND UPLINK SCHEDULING METHOD

(71) Applicant: MITSUBISHI ELECTRIC CORPORATION, Tokyo (JP)

(72) Inventors: Yukio Hirano, Tokyo (JP); Kenichi Nakura, Tokyo (JP); Takashi Nishitani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 233 days.

(21) Appl. No.: 16/303,418

(22) PCT Filed: Jul. 25, 2016

(86) PCT No.: PCT/JP2016/071773
§ 371 (c)(1),
(2) Date: Nov. 20, 2018

(87) PCT Pub. No.: WO2018/020559
PCT Pub. Date: Feb. 1, 2018

(65) Prior Publication Data
US 2019/0319866 A1    Oct. 17, 2019

(51) Int. Cl.
*H04L 12/26* (2006.01)
*H04J 3/06* (2006.01)
(Continued)

(52) U.S. Cl.
CPC ........ *H04L 43/0852* (2013.01); *H04J 3/0667* (2013.01); *H04J 3/0682* (2013.01);
(Continued)

(58) Field of Classification Search
None
See application file for complete search history.

(56) References Cited

U.S. PATENT DOCUMENTS

2006/0268704 A1* 11/2006 Ansari ............... H04J 14/0252
370/230
2007/0110099 A1* 5/2007 Ozaki .................... H04B 10/27
370/468

(Continued)

FOREIGN PATENT DOCUMENTS

| CN | 104782084 A | 7/2015 |
| CN | 105164978 A | 12/2015 |
| JP | 2008-289202 A | 11/2008 |

OTHER PUBLICATIONS

Chinese Office Action for Chinese Application No. 201680087460.X, dated Nov. 3, 2020, with English translation.

*Primary Examiner* — Kodzovi Acolatse
(74) *Attorney, Agent, or Firm* — Birch, Stewart, Kolasch & Birch, LLP

(57) ABSTRACT

An optical line terminal (OLT) for an optical network configured to communicate with optical network units (ONUs) in a PON-type optical network, the OLT including: a processing circuitry, for each ONUs, to manage a transmission delay time in transmission to the ONU to manage an acceptable waiting time of uplink data of the ONU; to obtain an uplink transmission start time and data amount of the optical network unit, based on uplink assignment information; and to generate uplink transmission grant information, which is made up of a time point and time length of uplink transmission to the ONU, wherein the processing circuitry determines the uplink transmission grant information on transmission to the ONU, based on a transmission delay time of the ONU, on the uplink transmission start time and data amount of the ONU, and on the acceptable waiting time of uplink data of the ONU.

19 Claims, 12 Drawing Sheets

(51) Int. Cl.
*H04J 3/16* (2006.01)
*H04Q 11/00* (2006.01)
H04L 12/50 (2006.01)
H04L 12/70 (2013.01)

(52) U.S. Cl.
CPC ........ *H04J 3/1652* (2013.01); *H04Q 11/0067* (2013.01); *H04L 12/50* (2013.01); *H04L 2012/5675* (2013.01)

(56) References Cited

U.S. PATENT DOCUMENTS

| | | | | |
|---|---|---|---|---|
| 2010/0054739 | A1* | 3/2010 | Lavillonniere | H04J 3/1694 398/67 |
| 2010/0098407 | A1* | 4/2010 | Goswami | H04B 10/032 398/5 |
| 2011/0311221 | A1* | 12/2011 | Mukai | H04J 3/1694 398/25 |
| 2012/0008954 | A1* | 1/2012 | Tanaka | H04L 7/033 398/67 |
| 2013/0089325 | A1* | 4/2013 | Sarashina | H04J 14/0246 398/35 |
| 2013/0266306 | A1* | 10/2013 | Kozaki | H04L 7/0075 398/5 |
| 2015/0311980 | A1 | 10/2015 | Kuwano et al. | |
| 2015/0326337 | A1* | 11/2015 | Yoshida | H04J 14/0247 398/48 |
| 2016/0080208 | A1 | 3/2016 | Takemoto et al. | |
| 2016/0248539 | A1* | 8/2016 | Kaneko | H04J 14/0295 |
| 2016/0285555 | A1* | 9/2016 | Wu | H04Q 11/0067 |
| 2017/0302380 | A1* | 10/2017 | Liu | H04B 10/27 |
| 2017/0317779 | A1* | 11/2017 | Wu | H04J 14/0232 |
| 2018/0234188 | A1* | 8/2018 | Hisano | H04J 14/08 |

\* cited by examiner

OPTICAL LINE TERMINAL OF OPTICAL NETWORK AND UPLINK SCHEDULING METHOD

TECHNICAL FIELD

The present invention relates to a passive optical network (PON) type optical network in which a single-core optical fiber is shared among a plurality of users by splitting an optical signal into a plurality of signals with use of a splitter, and more particularly, to an uplink scheduling method.

BACKGROUND ART

The application of a PON system to a radio access network (RAN) between a mobile antenna and a mobile base station is studied in recent years as well as application to household-targeted services. Generally speaking, high throughput and fairness are given importance in a household-targeted service, while real time-ness, namely, to keep delay small, is given importance in a RAN.

A PON system using a time division multiplexing (TDM) technology, for example, an Ethernet Passive Optical Network (EPON) or 10G-EPON defined by standards of the Institute of Electrical and Electronics Engineers (IEEE), or a G-PON or XG-PON defined by standards of the International Telecommunication Union (ITU), has a problem in keeping delay small, particularly delay in an uplink direction. The related art of a PON uplink scheduling method aiming to reduce an uplink delay is, for example, a method described in Patent Literature 1.

In Patent Literature 1, there is proposed an uplink scheduling method designed for G-PONs and adapted to both of real-time traffic, which is fixed in transmission timing as in an Internet Protocol (IP) phone service, and best-effort traffic, which varies in communication amount. When the bandwidth allocation cycle is set to an integral multiple of 125 microseconds, which are the basic cycle in G-PONs, the method enables a PON system to hold small-delay communication with a delay of an integral multiple of 125 microseconds by allocating the first half of the bandwidth allocation cycle to the transmission timing of real-time traffic. The method also enables efficient accommodation of real-time traffic and best-effort traffic by allocating the second half of the bandwidth allocation cycle to the transmission timing of best-effort traffic.

CITATION LIST

Patent Literature

[PTL 1] JP 2008-289202 A

SUMMARY OF INVENTION

Technical Problem

However, the related art of Patent Literature 1 in which a band set by a management system in advance is fixedly allocated to real-time traffic has a problem in that an excess bandwidth is allocated to real-time traffic, which varies in bandwidth.

Another problem with the related art of Patent Literature 1 is that the maximum delay amount of real-time traffic cannot be made less than the bandwidth allocation cycle.

The present invention has been made in view of the problems described above, and an object of the present invention is therefore to provide an optical line terminal for an optical network, an uplink scheduling method, and the like with which the allocation of a minimum bandwidth to real-time uplink traffic varying in bandwidth is possible, or the maximum delay amount of real-time uplink traffic can be reduced to a delay less than the bandwidth allocation cycle in a PON system.

Solution to Problem

According to one embodiment of the present invention, there is provided an optical line terminal for an optical network, which is configured to transmit to and receive from one or a plurality of optical network units in a PON-type optical network, the optical line terminal including: a transmission delay management unit configured to manage, for each of the one or plurality of optical network units, a transmission delay time in transmission to the optical network unit; an uplink delay time management unit configured to manage, for each of the one or plurality of optical network units, an acceptable waiting time of uplink data of the optical network unit; an uplink transmission time identification unit configured to obtain, for each of the one or plurality of optical network units, an uplink transmission start time and data amount of the optical network unit, based on uplink assignment information, which is sent from outside; and a band control unit configured to generate, for each of the one or plurality of optical network units, uplink transmission grant information, which is made up of a time point and time length of uplink transmission to the optical network unit, wherein the band control unit is configured to determine, for each of the one or plurality of optical network units, the uplink transmission grant information on transmission to the optical network unit, based on a transmission delay time of the optical network unit, on the uplink transmission start time and data amount of the optical network unit, and on the acceptable waiting time of uplink data of the optical network unit.

Advantageous Effects of Invention

According to one embodiment of the present invention, the optical line terminal can provide the allocation of a minimum bandwidth to real-time uplink traffic varying in bandwidth, or the maximum delay amount of real-time uplink traffic can be reduced to a delay less than the bandwidth allocation cycle in a PON system.

DESCRIPTION OF EMBODIMENTS

Now, an optical line terminal for an optical network, an uplink scheduling method, and the like according to each of embodiments of the present invention are described with reference to the drawings. In each of the embodiments, the same or corresponding portions are denoted by the same reference symbols, and the overlapping description thereof is omitted.

The present invention is not limited to the description below, and modifications can be made thereto as appropriate within the range not departing from the gist of the present invention.

The present invention includes two types of optical line terminals. One type is an optical line terminal in an optical communication system in which the optical line terminal (OLT) is at one end of an optical network, optical network units (ONUs) are at the other end of the optical network, and parent communication stations and child communication stations are outside the ends of the optical network. The other type is an optical line unit in an optical network in which the optical line unit (OLT) is at one end of the optical network and optical network units (ONUs) are at the other end of the optical network, and which have no parent communication stations and child communication stations outside the ends of the optical network. The description given below is based on the former optical communication system.

First Embodiment

Figure 1:
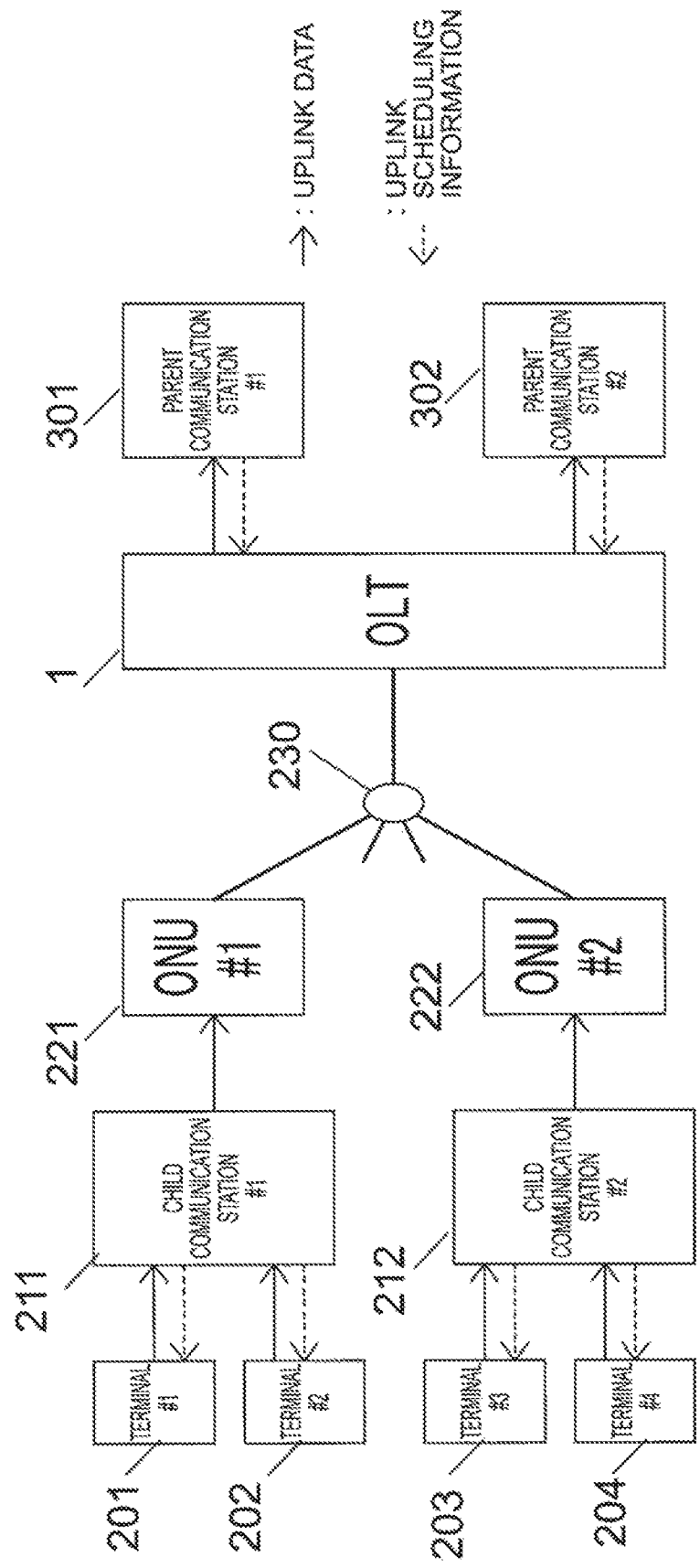
FIG. 1 is a diagram for illustrating an example of an optical communication system in which an optical line terminal (OLT) according to a first embodiment of the present invention is included.
Figure 2:
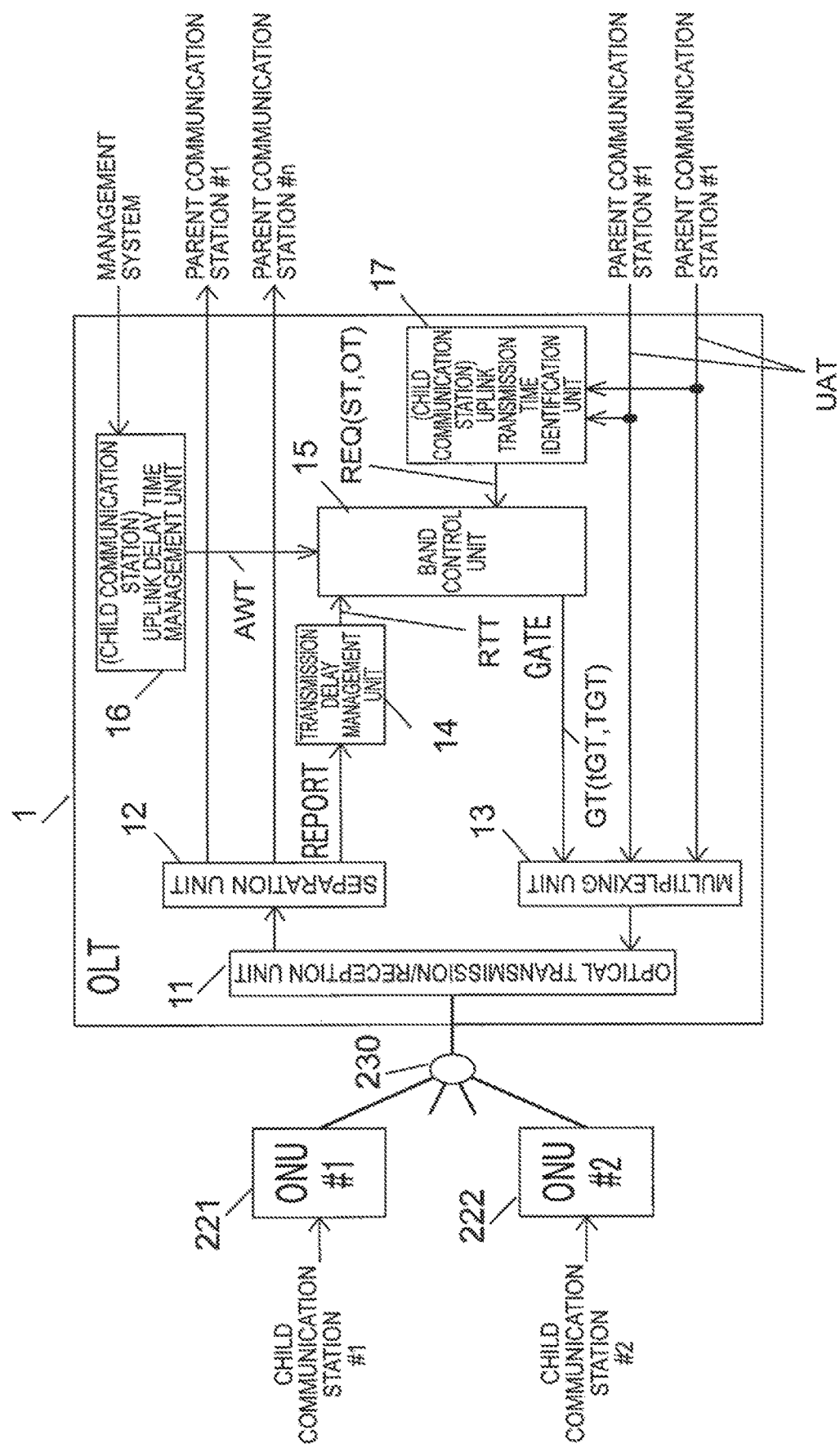
FIG. 2 is a diagram for illustrating an example of the configuration of the optical line terminal (OLT) of FIG. 1.
Figure 3:
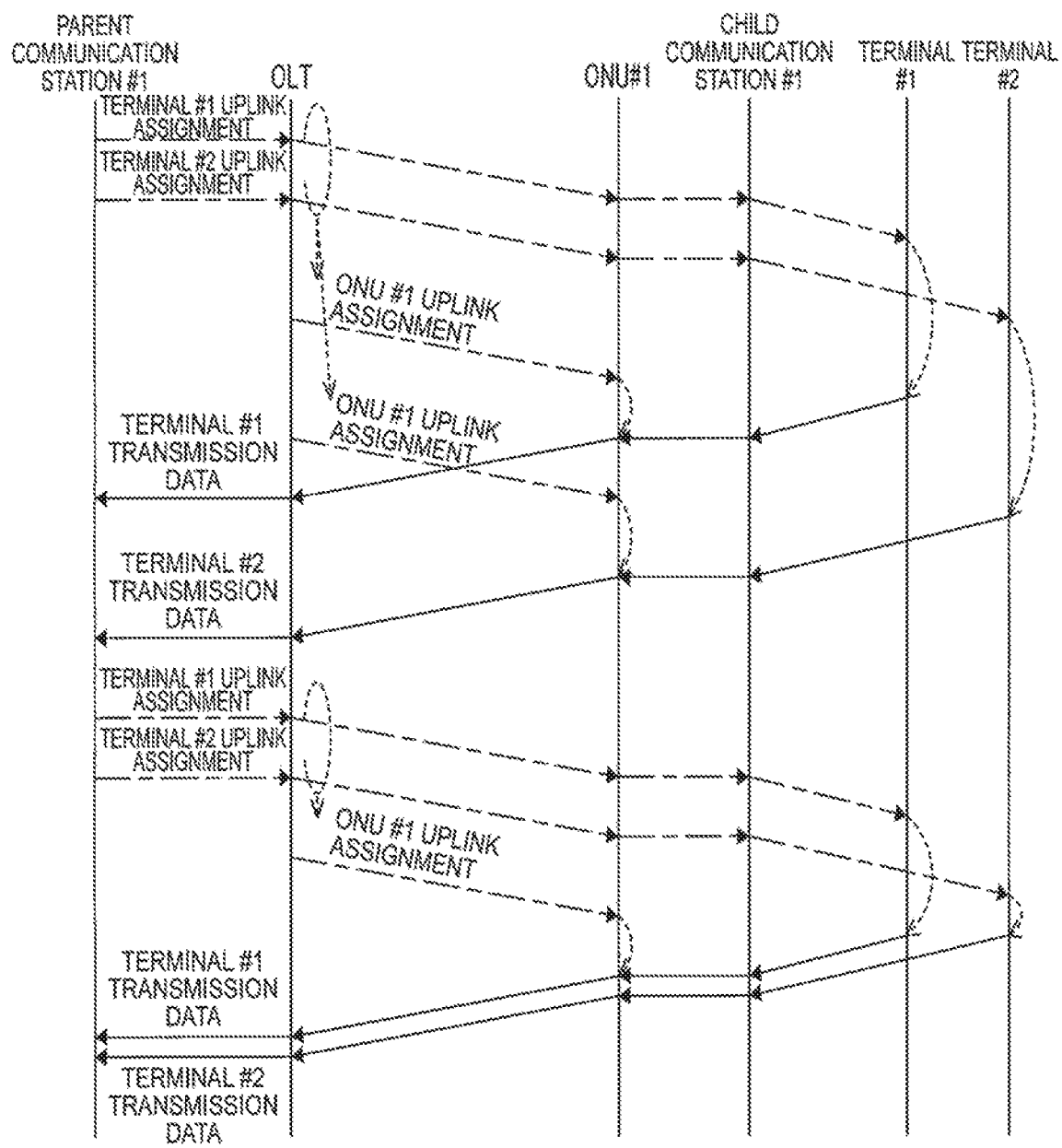
FIG. 3 is a diagram for illustrating an example of a sequence of uplink data communication from terminals of FIG. 1 to one of parent communication stations.

FIG. 1 is a diagram for illustrating an example of an optical communication system in which an optical line terminal (OLT) according to a first embodiment of the present invention is included. FIG. 2 is a diagram for illustrating an example of the configuration of the optical line terminal (OLT) of FIG. 1. FIG. 3 is a diagram for illustrating an example of a sequence of uplink data communication from terminals of FIG. 1 to one of parent communication stations. The operation is described below with reference to FIG. 1, FIG. 2, and FIG. 3.

In FIG. 1, a parent communication station #1 (301) and a parent communication station #2 (302) are connected to a child communication station #1 (211) and a child communication station #2 (212) by a PON system, which is a PON-type optical network including an OLT 1, an ONU #1 (221), an ONU #2 (222), and a beam splitter 230. A communication terminal #1 (201) and a communication terminal #2 (202) are connected to the child communication station #1 (211). A communication terminal #3 (203) and a communication terminal #4 (204) are connected to the child communication station #2 (212).

The delay time is ignorable in transmission between the parent communication station #1 (301) and the OLT 1 and between the parent communication station #2 (302) and the OLT1, and in transmission between one of the ONUs #1 (221) and #2 (222) and one of the child communication stations #1 (211) and #2 (222). On the other hand, the delay time cannot be ignored in transmission between the OLT 1 and the ONU #1 (221) and between the OLT 1 and the ONU #2 (222), and in transmission between one of the child communication stations #1 (211) and #2 (212) and one of the communication terminals #1 (201), #2 (202), #3 (203), and #4 (204).

In FIG. 1, each solid-line arrow indicates uplink data and each broken-line arrow indicates uplink scheduling information. The parent communication stations #1 (301) and #2 (302) execute scheduling processing for each of the communication terminals #1 (201), #2 (202), #3 (203), and #4 (204) with respect to an uplink between one of the child communication stations #1 (211) and #2 (212) and one of the communication terminals #1 (201), #2 (202), #3 (203), and #4 (204). Uplink scheduling information generated by the parent communication stations #1 (301) and #2 (302) is notified to the communication terminals #1 (201), #2 (202), #3 (203), and #4 (204) via the OLT 1, the ONUs 221 and 222, and the child communication stations 211 and 212.

In the OLT 1 of FIG. 2, an optical signal from the ONU 221 or 222 is converted into an electric signal by an optical transmission/reception unit 11. The electric signal receives separation processing in a separation unit 12 to be sent to a transmission delay management unit 14 and the external parent communication stations #1 (301) and #2 (302). An electric signal from the external parent communication station #1 (301) or #2 (302) receives multiplexing processing in a multiplexing unit 13, and is converted into an optical signal by the optical transmission/reception unit 11 to be sent toward the ONU 221 or 222. The signal from the parent communication station #1 (301) or #2 (302) is input to a child communication station uplink transmission time identification unit 17. A signal from an external management system (not shown) is input to a child communication station uplink delay time management unit 16. A signal from the child communication station uplink transmission time identification unit 17, a signal from the child communication station uplink delay time management unit 16, and a signal from the transmission delay management unit 14 are input to a band control unit 15. Each signal input to and processed by the band control unit receives multiplexing processing in the multiplexing unit 13, and is converted into an optical signal by the optical transmission/reception unit 11 to be sent to the ONU 221 or 222.

A sequence in which the parent communication station #1 (301) executes uplink scheduling and receives uplink data from the terminal #1 (201) and the terminal #2 (202) is described with reference to FIG. 2 and FIG. 3. It is assumed here that the parent communication station #1 (301) has received communication requests of the terminal #1 and the terminal #2 prior to this sequence, and that the terminal #1 (201) and the terminal #2 (202) each "know" the delay time in transmission to the parent communication station, in other words, store transmission delay time information.

The parent communication station #1 (301) first executes uplink scheduling processing based on the communication requests from the terminal #1 (201) and the terminal #2 (202), and transmits terminal #1 uplink assignment information and terminal #2 uplink assignment information down the links. The OLT 1 transmits the terminal #1 uplink assignment information and the terminal #2 uplink assignment information as downlink data to the ONU #1 (221) via the multiplexing unit 13 and the optical transmission/reception unit 11. At the same time, the child communication station uplink transmission time identification unit 17 in the OLT 1 identifies the terminal #1 uplink assignment information and the terminal #2 uplink assignment information.

Figure 5:
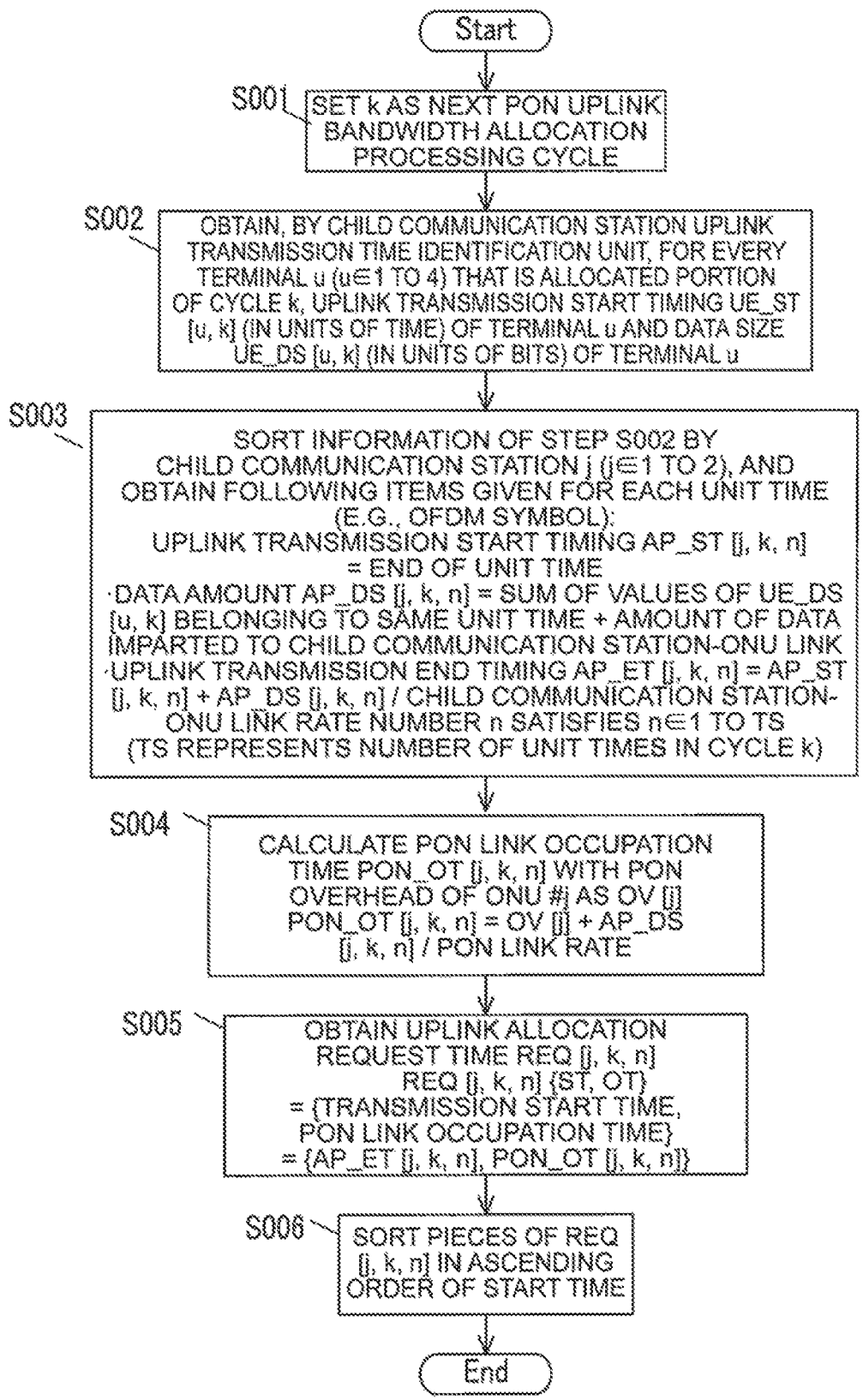
FIG. 5 is a flowchart for illustrating an example of a processing flow of a child communication station uplink transmission time identification unit, which is included in the OLT according to the first embodiment of the present invention.

The child communication station uplink transmission time identification unit 17 follows a processing flow of FIG. 5 to generate, for each of the child communication stations #1 (211) and #2 (212), an uplink allocation request time (REQ) in the bandwidth allocation cycle, based on the identified uplink assignment information (UAI), which is one of the terminal #1 (201) uplink assignment information and terminal #2 (202) uplink assignment information sent from the parent communication station #1 (301) or #2 (302). The generated uplink allocation request time (REQ) is transmitted to the band control unit 15. The uplink allocation request time (REQ) is made up of an uplink transmission start time (ST) and a PON link occupation time (OT), which indicates the amount of data. The PON link rate here is equal to or more than the sum of link rates of two child communication stations in links to terminals.

In FIG. 5, first, the next PON uplink bandwidth allocation processing cycle is set to k (Step S001).

Next, the child communication station uplink transmission time identification unit 17 obtains, for every terminal u (u∈1, 2, 3, 4) that is allocated a portion of the cycle k, uplink transmission start timing UE_ST [u, k] (in units of time) of the terminal u and a data size UE_DS [u, k] (in units of bits) of the terminal u (Step S002). The data size UE_DS [u, k] in this step is the amount of information transmitted from the terminal to one of the child communication stations, not the amount of information transmitted from one of the child communication stations to one of the ONUs.

Next, the information on the uplink transmission start timing and the data size is sorted by a child communication station j (j∈1, 2), and items given below are obtained for each unit time (Step S003). The unit time is, for example, an OFDM symbol time or a Transmission Time Interval (TTI).
a) Uplink transmission start timing AP_ST [j, k, n] of data transmitted by the child communication station is obtained. In an example in which the child communication station starts transmitting data that is generated within the unit time at the end of the unit time as in FIG. 7, the uplink transmission start timing AP_ST [j, k, n] is the end of the unit time.
b) A data amount AP_DS [j, k, n] of data transmitted by the child communication station is obtained by calculating the sum of values of UE_DS [u, k] that belong to the same unit time, and adding, to the sum, the amount of data that is imparted by the child communication station to a link between the child communication station and the ONU. The imparted data is, for example, a MAC address or a preamble.
c) Uplink transmission end timing AP_ET [j, k, n] is obtained. For example, the uplink transmission end timing AP_ET [j, k, n] is calculated by AP_ST [j, k, n]+AP_DS [j, k, n]/child communication station-ONU link rate.

In each of the items a) to c), n satisfies n∈1 to TS (TS represents the number of unit times in the cycle k).

Next, a PON link occupation time PON_OT [j, k, n] is calculated with the PON overhead of the ONU #j as OV [j] (in units of time) (Step S004).

PON_OT [j, k, n]=OV [j]+AP_DS [j, k, n]/PON link rate

Next, the uplink allocation request time REQ [j, k, n] is obtained (Step S005).

$$REQ\ [j,k,n]\ \{ST,OT\} = \{\text{transmission start time,}$$
$$PON\text{ link occupation time}\}$$
$$= \{AP\_ET\ [j,k,n], PON\_OT\ [j,k,n]\}$$

Next, pieces of REQ [j, k, n] are sorted in ascending order of the start time (Step S006).

Figure 6:
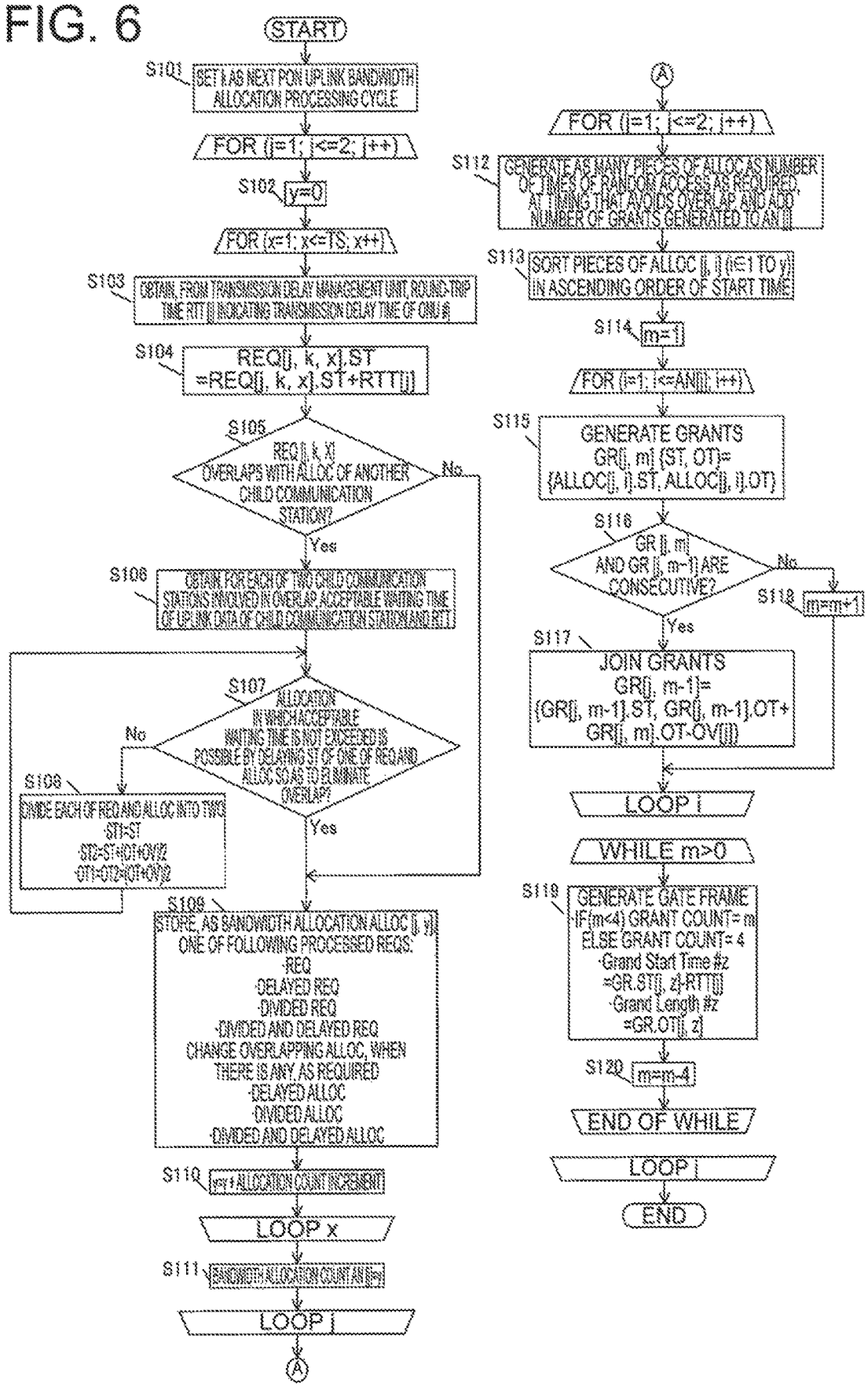
FIG. 6 is a flowchart for illustrating an example of a processing flow of a band control unit, which is included in the OLT according to the first embodiment of the present invention.

The band control unit 15 follows a processing flow of FIG. 6 to allocate bandwidths based on all pieces of REQ in the bandwidth allocation cycle k. In the bandwidth allocation cycle k (Step S101), a bandwidth allocation count is cleared to 0 (Step S102). For each child communication station, a round-trip time (RTT) indicating the delay time in round-trip transmission between the child communication station and the ONU to which the child communication station is connected is obtained from the transmission delay management unit 14, which manages the RTT based on a report frame from the child communication station (Step S103). The obtained RTT is added in order to match the transmission start time (ST) of the uplink allocation request time (REQ) with the time of reception at the OLT 1 (Step S104).

It is then determined whether a period counted from the transmission start time of the uplink allocation request time REQ and lasting for the PON link occupation time overlaps with a period counted from the transmission start time of bandwidth allocation ALLOC of another child communication station and lasting for the PON link occupation time (Step S105).

When there is no overlap, the uplink allocation request time REQ is stored as the bandwidth allocation ALLOC (Step S109).

When there is an overlap, the acceptable waiting time (AWT) of uplink data of each child communication station involved in the overlap is obtained from the child communication station uplink delay time management unit 16, which uses information from an external management system to manage the uplink delay times of the child communication stations (Step S106). From the obtained acceptable waiting time of uplink data, it is determined whether it is possible to delay one of the overlapping bandwidth allocation ALLOC and uplink allocation request time REQ so as to eliminate the overlap (Step S107).

To give an example of the process of the determination, when the bandwidth allocation ALLOC [1, k, x] {ST, OT} and the uplink allocation request time REQ [2, k, x] {ST, OT} at T1, T2, T3 . . . , which are consecutive time units of a freely-selected length, are given as {T1, 2} and {T2, 2}, respectively, an overlap occurs in a period between T2 and T3.

As a solution, delaying the start time of the uplink allocation request time REQ [2, k, x] is considered first. The overlap can be eliminated by delaying the transmission start time of the uplink allocation request time REQ [2, k, x] by one unit time to T3, which is the transmission end time of the bandwidth allocation ALLOC [1, k, x]. When the acceptable waiting time (AWT) of uplink data of the ONU #1 is set to 3.2 unit times and the RTT [2] of the ONU #2 is set to 0.6 unit time, which means that the one-way delay is 0.3 unit time, the sum of the amount of time by which the uplink allocation request time REQ [2, k, x] is delayed and the one-way delay time is 1.3 unit times and does not exceed the AWT, which is 3.2 unit times. It is therefore determined that the delaying of the uplink allocation request time REQ [2, k, x] is a viable solution.

A contrary option in which the bandwidth allocation ALLOC [1, k, x] is delayed is considered. The overlap can be eliminated by delaying the transmission start time of the bandwidth allocation ALLOC [1, k, x] by 3 unit times to T4, which is the transmission end time of the bandwidth allocation ALLOC [1, k, x]. When the AWT of the ONU #1 is again set to 3.2 unit times and the RTT [1] of the ONU #1 is set to 0.8 unit time, which means that the one-way delay is 0.4 unit time, the sum of the amount of time by which the bandwidth allocation ALLOC [1, k, x] is delayed and the one-way delay time is 3.4 unit times and exceeds the AWT, which is 3.2 unit times. It is therefore determined that the delaying of the bandwidth allocation ALLOC [1, k, x] is not a viable option.

When the condition is met just by delaying REQ as in the example described above, the delayed uplink allocation request time REQ is stored as the bandwidth allocation ALLOC (Step S109).

When the condition is met just by delaying ALLOC, the stored ALLOC is updated and the uplink allocation request time REQ is stored as the bandwidth allocation ALLOC (Step S109).

When the condition is not met neither by delaying REQ nor by delaying ALLOC, REQ and ALLOC are each divided into two in order to halve the amount of time by which REQ or ALLOC is delayed (Step S108).

Specifically, when the AWT of the ONU #1 and the AWT of the ONU #2 are both 1.0 unit time in the example described above, the delaying of REQ and the delaying of ALLOC both result in a sum that exceeds the AWT, and each of the PON link occupation times is therefore halved. In this case, a PON overhead expressed by laser ON time+laser OFF time+sync time (synchronization time) is added to the PON link occupation time of the ONU #1 and the PON link occupation time of the ONU #2 each. A gap between adjacent optical bursts may be added to the PON overhead. Here, the PON overhead OV [1] of the ONU #1 and the PON overhead OV [2] of the ONU #2 are both set to 0.2. Results obtained by dividing each of REQ and ALLOC into two with use of the value 0.2 are ALLOC [1, k, x] {ST1, OT1}={T1, 1.1}, ALLOC [1, k, x] {ST2, OT2}={T2+0.1, 1.1}, REQ [2, k, x] {ST1, OT1}={T2, 1.1}, and REQ [2, k, x] {ST2, OT2}={T3+0.1, 1.1}.

After this division, the determination of Step S107 is executed again to find out that the overlap is eliminated, without exceeding the AWT, by setting ALLOC [1, k, x] {ST1, OT1} to {T1, 1.1}, REQ [2, k, x] {ST1, OT1} to {T2+0.1, 1.1}, ALLOC [1, k, x] {ST2, OT2} to {T2+0.2, 1.1}, and REQ [2, k, x] {ST2, OT2} to {T3+0.3, 1.1}. The largest delay among the four is a delay of 0.6 unit time of REQ [2, k, x] {ST2, OT2} and ALLOC [1, k, x] {ST2, OT2}.

It is assumed that the condition of Step S107 is met without fail by repeating Step S107 and Step S108. When the condition of Step S107 is not met no matter how many times Step S107 and Step S108 are repeated, it means that the child communication station cannot be accommodated in that PON system, and such measures as a reduction in the number of child communication stations accommodated, a reduction of the PON overhead, and an improvement in PON link rate are required.

When the condition of Step S107 is met, the divided, or divided and delayed, uplink allocation request time REQ is stored as the bandwidth allocation ALLOC. The existing bandwidth allocation ALLOC, too, is divided and delayed as required, and the divided and delayed bandwidth allocation ALLOC is stored (Step S109). The bandwidth allocation count is then added (Step S110). This is repeated as many times as the unit time count TS in the bandwidth allocation cycle k to obtain a bandwidth allocation count AN (Step S111). This series of processing steps is repeated for each child communication station.

Figure 4:
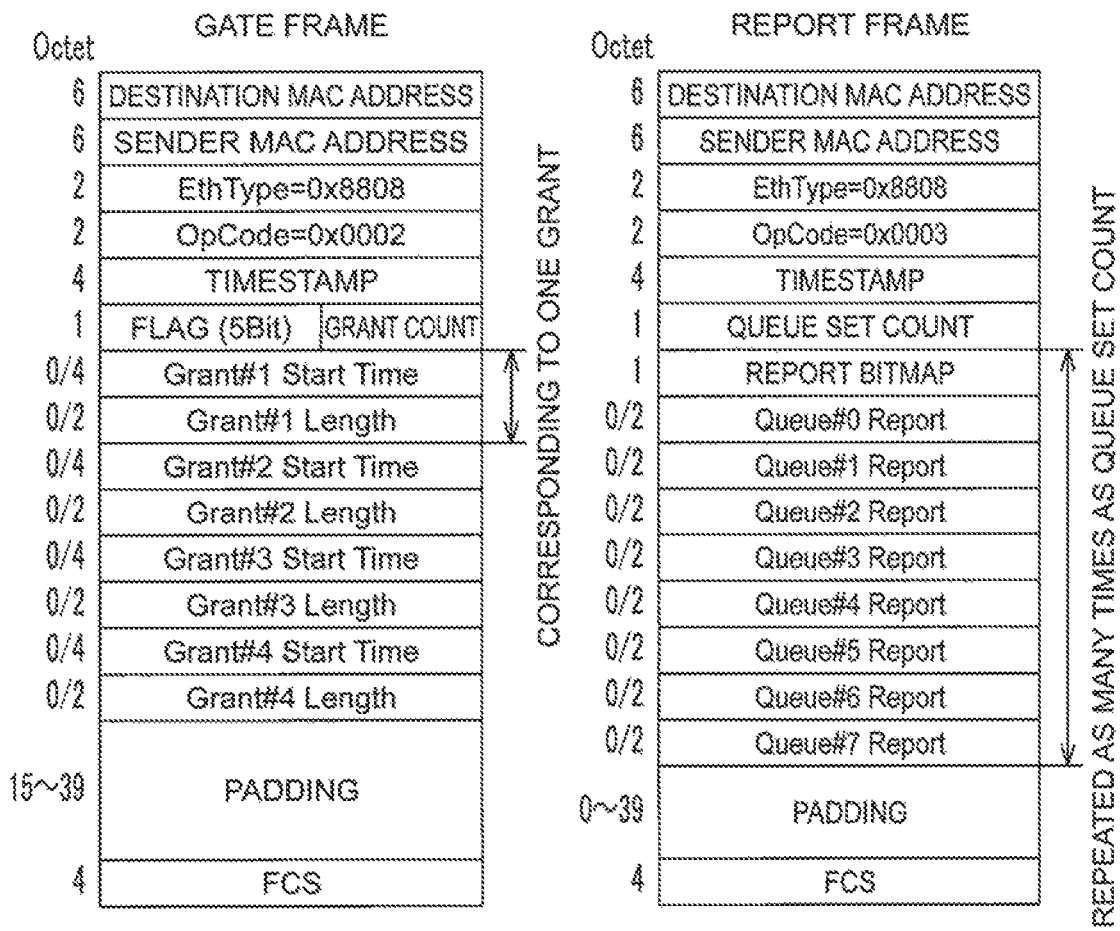
FIG. 4A and FIG. 4B are diagrams for illustrating an example of the formats of a gate frame and a report frame in the first embodiment of the present invention.

The band control unit 15 also generates an actual gate frame from those pieces of bandwidth allocation ALLOC. An example of the format of the gate frame is illustrated in FIG. 4A. An example of the format of a report frame, which is described later, is illustrated in FIG. 4B. First, as many pieces of bandwidth allocation ALLOC as the number of times random access is made are generated for each ONU as required, at appropriate timing that avoids an overlap (Step S112). When random access is granted once per second, for example, ALLOC is generated in a bandwidth allocation cycle that falls into the 1-second mark. To give another example, four pieces of ALLOC are generated when random access is granted four times in each bandwidth allocation cycle k.

Next, the generated pieces of bandwidth allocation ALLOC are sorted in ascending order of the start time (Step S113), a grant count is set to 1 (Step S114), and grants GR are generated (Step S115).

The grants belong to the same ONU and are accordingly consecutive in some cases (Step S116). Two grants that are consecutive are joined together (Step S117). When there are no consecutive grants, the number of grants generated in Step S115 is increased by one (Step S118). Grants are generated by repeating this process.

Next, a gate frame is generated from the grants (Step S119). Only one gate frame is generated when the grant count is 4 or less, and a plurality of gate frames are generated when the grant count is 5 or more. This is repeated for each ONU, to thereby generate gate frames in the bandwidth allocation cycle k. The OLT 1 uses the multiplexing unit 13 to multiplex a gate frame, which is uplink transmission grant information (GT) made up of an uplink transmission time (tGT) and a time length (TGT), with downlink data, and uses the optical transmission/reception unit 11 to transmit the multiplexed gate frame to the ONU #1 (221) and the ONU #2 (222).

The ONU #1 (221) and the ONU #2 (222) receive the gate frame, and each transmit uplink data received from the relevant child communication station at timing allocated to the ONU and in a length allocated to the ONU. When grants given to the ONU are ones generated by dividing the allocation request time REQ, the ONU divides the uplink data received from the child communication station as well and transmits the uplink data in pieces. The uplink data from each ONU is received by the optical transmission/reception unit 11 of the OLT 1, and is separated by the separation unit 12 into uplink data to be transmitted to the parent communication station #1 (301) and uplink data to be transmitted to the parent communication station #2 (302). When required, the pieces of uplink data created by the separation in the separation unit 12 receive joining processing, and uplink data created by the joining is transmitted to the parent communication stations.

Figure 7:
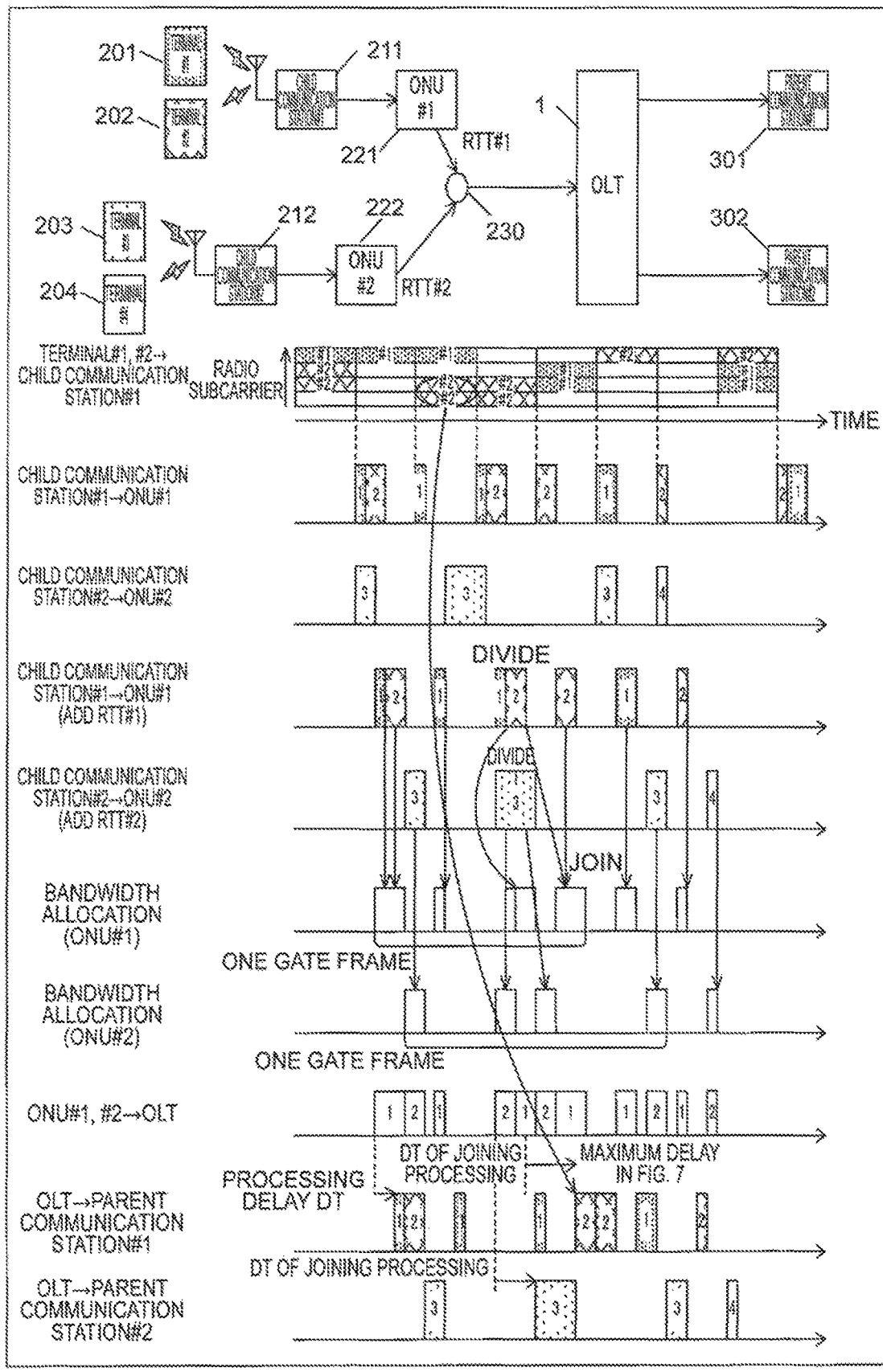
FIG. 7 is an example of an operation timing chart of the terminals, the child communication stations, ONUs, the OLT, and the parent communication stations in the first embodiment of the present invention.

FIG. 7 is an example of an operation timing chart of the terminals, the child communication stations, the ONUs, the OLT, and the parent communication stations in the first embodiment. For example, a notation "terminals #1, #2→child communication station #1" indicates a signal from each of the terminal #1 (201) and the terminal #2 (202) to the child communication station #1 (211). It is assumed in FIG. 7 that the terminals #1 (201), #2 (202), #3 (203), and #4 (204) hold radio communication to and from the child communication terminals #1 (211) and #2 (212), and that uplink data can be transmitted from a plurality of terminals simultaneously to one child communication station with the use of radio subcarriers. This example of the operation timing chart includes a case in which there is an overlap between the child communication station #1 (221) and the child communication station #1 (222) in terms of uplink transmission timing determined by taking into account the RTT of each ONU. Delays in transmission to the parent communication stations in this case are minimized by halving each of the bandwidth allocation of the child communication station #1 (221) and the bandwidth allocation of the child communication station #2 (222).

The first embodiment has an advantageous effect in that no excessive bandwidth is allocated to real-time traffic, which varies in bandwidth.

Another advantageous effect of the first embodiment is that the maximum delay amount of real-time traffic can be reduced to a delay less than the bandwidth allocation cycle.

Figure 8:
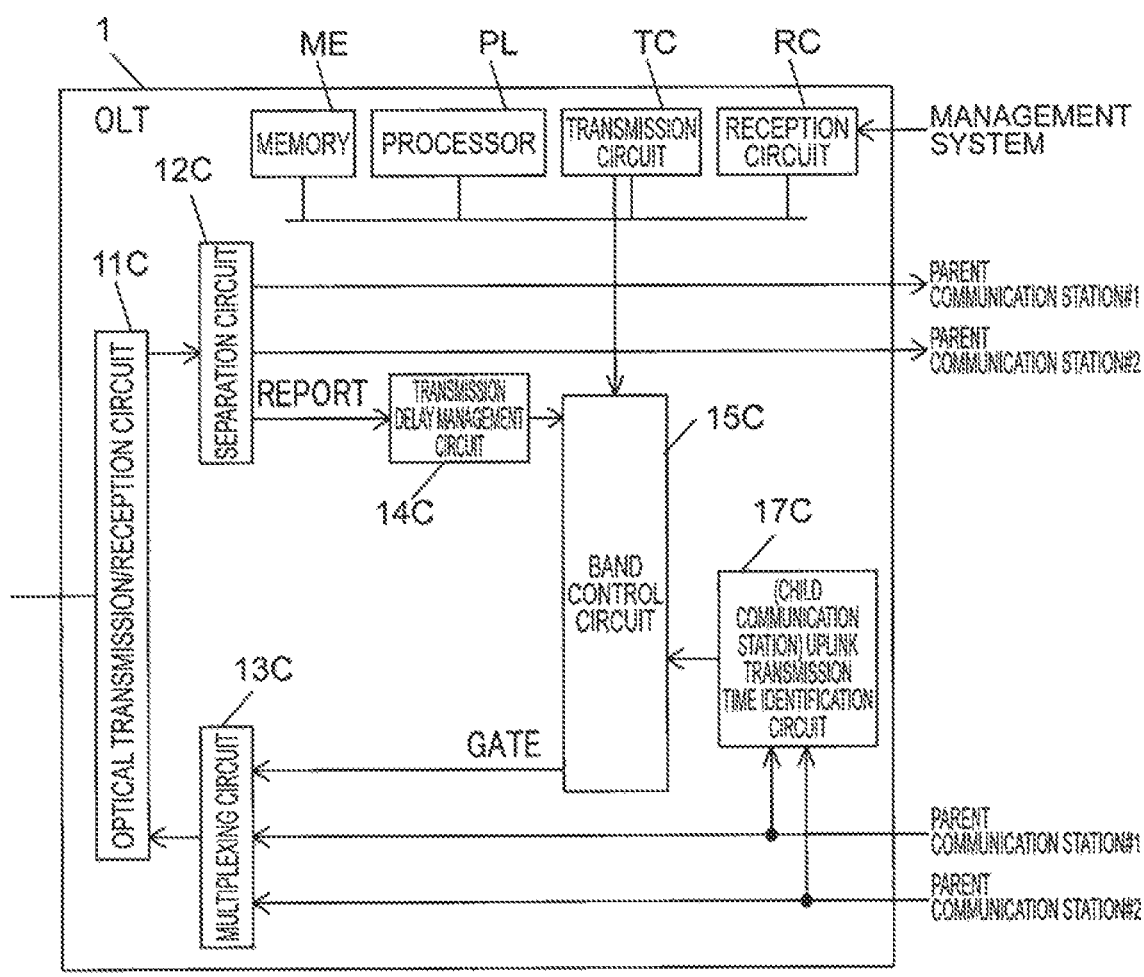
FIG. 8 is a diagram for illustrating an example of the hardware configuration of the OLT according to the first embodiment of the present invention.

An example of the hardware configuration of the OLT according to the first embodiment of the present invention is illustrated in FIG. 8. A processing circuit that is dedicated hardware can be, for example, a single circuit, a composite circuit, a processor in the form of a program, a processor in the form of a parallel program, an ASIC, an FPGA, or some combination of the above.

In FIG. 8, a memory ME, a processor PL, a transmission circuit TC, and a reception circuit RC make up a computer. The optical transmission/reception unit 11, the separation unit 12, the multiplexing unit 13, the transmission delay management unit 14, the band control unit 15, and the child communication station uplink transmission time identification unit 17 in FIG. 2, for example, are constructed respectively from an optical transmission/reception circuit 11C, a separation circuit 12C, a multiplexing circuit 13C, a transmission delay management circuit 14C, a band control circuit 15C, and a child communication station uplink transmission time identification circuit 17C, which are pieces of hardware. The child communication station uplink delay time management unit 16 is constructed from the computer. A signal from the external management system is input to the computer as well.

Figure 9:
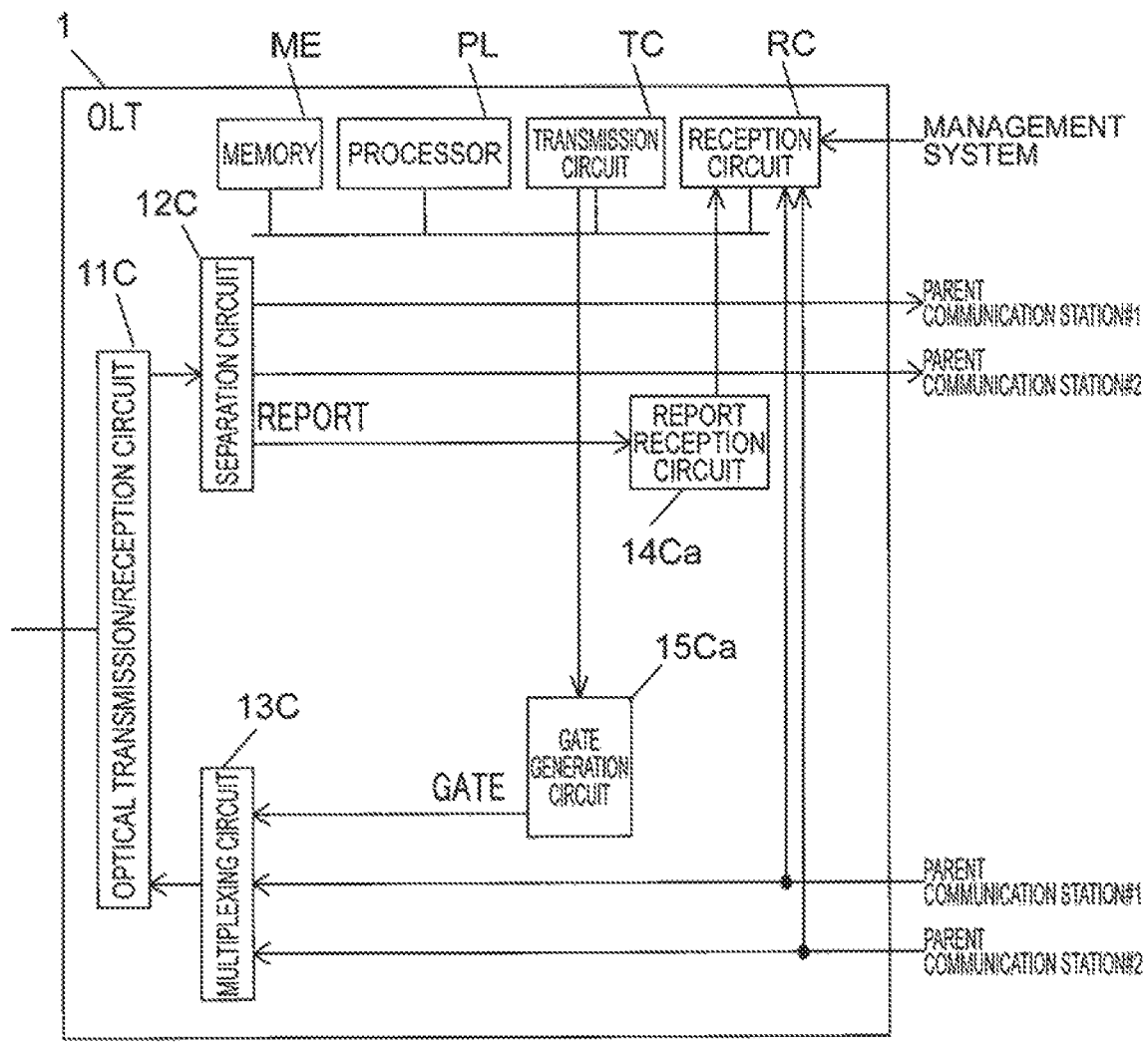
FIG. 9 is a diagram for illustrating another example of the hardware configuration of the OLT according to the first embodiment of the present invention.

Another example of the hardware configuration of the OLT according to the first embodiment of the present invention is illustrated in FIG. 9. The functions of the units of the OLT are implemented by software, firmware, or a combination of software and firmware when the processing circuit used is a CPU. Software or firmware is written as a program and stored in a memory. The processing circuit implements the functions of the units by reading and executing the program recorded in the memory.

Some of the functions may be implemented by dedicated hardware while the rest of the functions are implemented by software or firmware. The processing circuit can implement the functions by hardware, software, firmware, or some combination of the above.

In FIG. 9, while the optical transmission/reception unit 11, the separation unit 12, and the multiplexing unit 13 in FIG. 2 are constructed respectively from the optical transmission/reception circuit 11C, the separation circuit 12C, and the multiplexing circuit 13C, which are pieces of hardware, the child communication station uplink delay time management unit 16 and the child communication station uplink transmission time identification unit 17 are constructed from the computer. The transmission delay management unit 14 is partially constructed from hardware so that only a report reception circuit 14Ca is a hardware circuit while the unit's main part is constructed from the computer. The band control unit 15 is partially constructed from hardware so that only a gate generation circuit 15Ca is a hardware circuit while the unit's main part is constructed from the computer.

Second Embodiment

Figure 10:
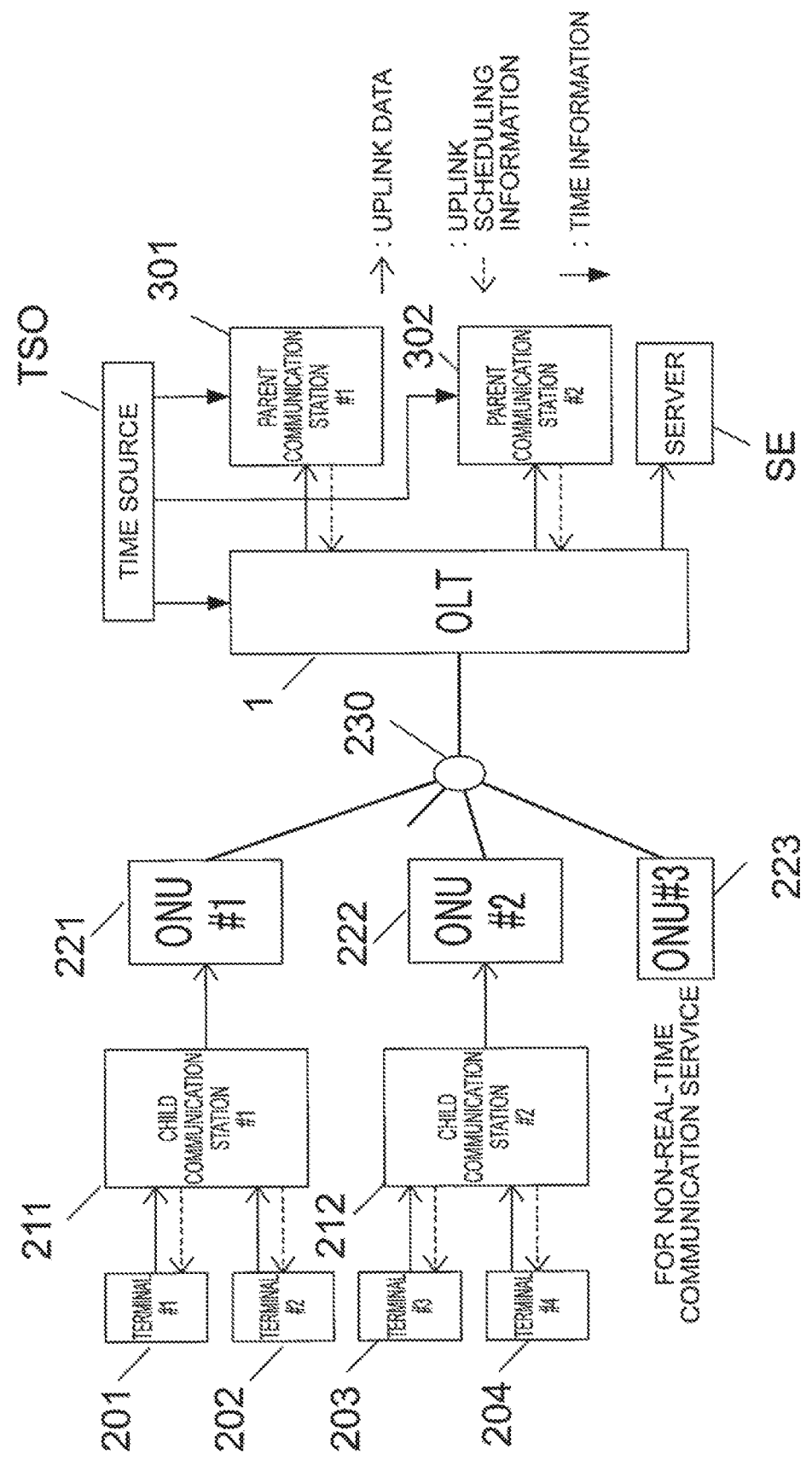
FIG. 10 is a diagram for illustrating an example of an optical communication system in which an optical line terminal (OLT) according to a second embodiment of the present invention is included.

FIG. 10 is a diagram for illustrating an example of an optical communication system in which an optical line terminal (OLT) according to a second embodiment of the present invention is included. In the optical communication system of FIG. 10, an ONU #3 (223), which handles a non-real-time communication service, for example, an Internet connection service, in addition to real-time traffic, is connected to the optical network as well. A time source TSO of FIG. 10 is, for example, a GPS receiver configured to catch radio waves of a GPS satellite. The optical communication system may include one GPS receiver, or may include one GPS receiver in each of the OLT 1, the parent communication station #1 (301), and the parent communication station #2 (302). The arrow with a triangular head indicates time information. A server SE can additionally be connected to the OLT 1.

Figure 11:
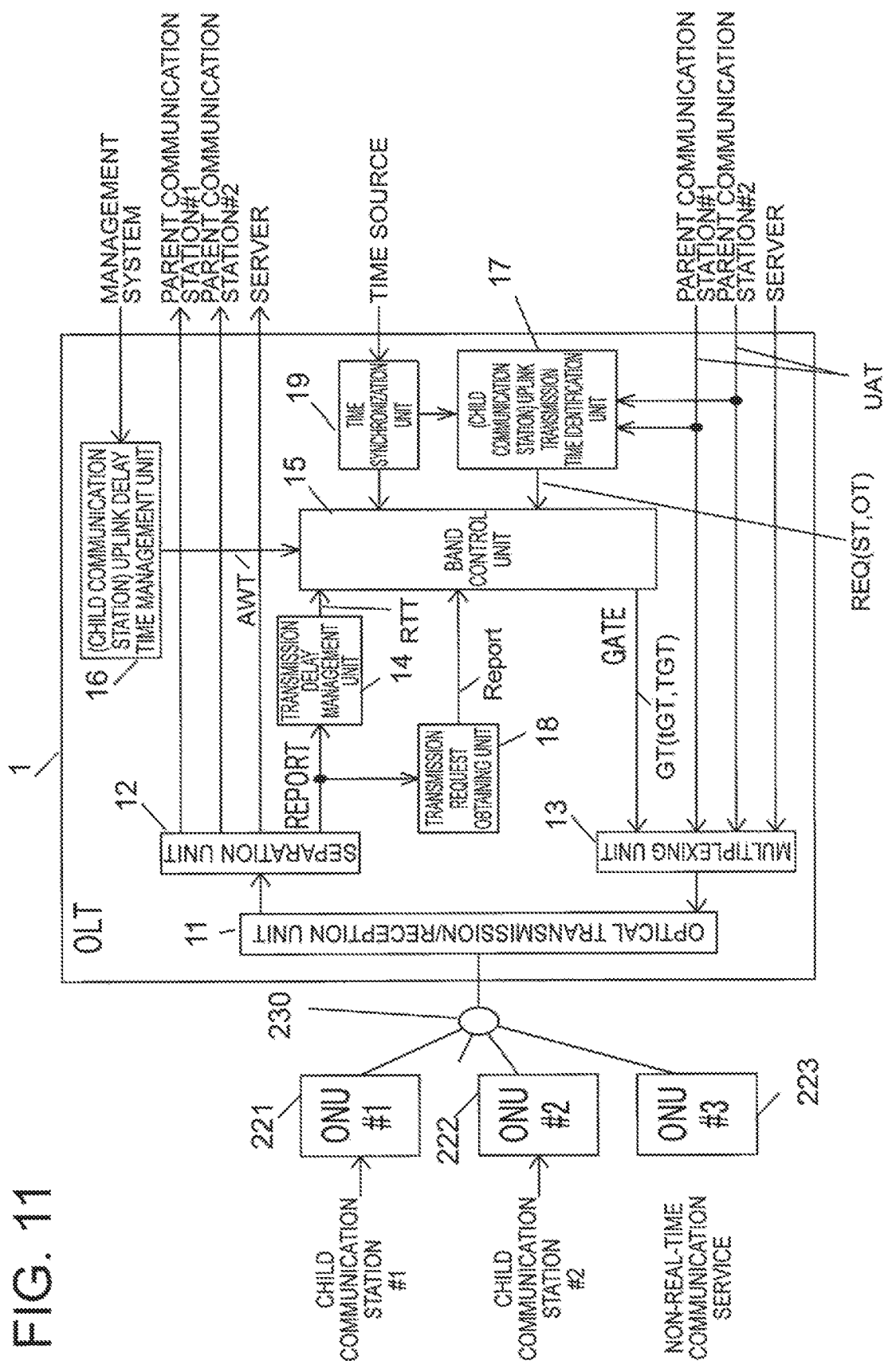
FIG. 11 is a diagram for illustrating an example of the configuration of the optical line terminal (OLT) of FIG. 10.

FIG. 11 is a diagram for illustrating an example of the configuration of the OLT according to the second embodiment of the present invention. The operation is described with reference to FIG. 11. Uplink scheduling of the parent communication stations #1 (301) and #2 (302) with respect to the terminals #1 (201), #2 (202), #3 (203), and #4 (204), and uplink data transmission processing of the terminals are the same as those in the first embodiment. Processing executed by the child communication station uplink transmission time identification unit 17 of the OLT 1 to identify the terminal #1 (201) uplink assignment information and the terminal #2 (202) uplink assignment information is also the same as the one in the first embodiment.

A transmission request obtaining unit 18 of the OLT 1 receives a report from the ONU #3 (223) via the optical transmission/reception unit 11 and the separation unit 12, obtains a queue #n report in the report frame of FIG. 4B, which is a transmission request of the ONU #3 (223), and notifies the obtained report to the band control unit 15. Next, the band control unit 15 first follows FIG. 6 to generate grants (GR) for the ONU #1 (221) and the ONU #2 (222), which handle real-time traffic, generates a gate frame, and transmits the gate frame to the ONU #1 (221) and the ONU #2 (222) via the multiplexing unit 13 and the optical transmission/reception unit 11.

The band control unit 15 can perform the determination about whether the acceptable waiting time is exceeded and the division of a request with precision by synchronizing time with the parent communication stations. For the synchronization, the child communication station uplink transmission time identification unit 17 obtains time information via a time synchronization unit 19, to thereby calculate, for each child communication station, the uplink transmission start time and the data amount, namely, REQ {ST, OT}, from the time at which the synchronization with the parent communication stations is completed and from the uplink assignment information, which is obtained from the parent communication stations and related to uplink scheduling.

For example, when acceptable waiting times of uplink data of the two child communication stations are both given as AD, and DT is given as the maximum value of a processing time from data reception at the OLT 1 to transmission from the OLT 1 to the relevant parent communication station, the transmission start timing of each terminal is UE_ST [u, k] identified by the child communication station uplink transmission time identification unit 17, and whether the acceptable waiting time is exceeded can accordingly be determined by finding out whether delayed REQ.ST or delayed ALLOC.ST exceeds UE_ST [u, k]+AD+DT. The precision in this manner of determining whether the acceptable waiting time is exceeded is finer than when the unit time is used in the determination, which makes determination without an error possible and prevents unnecessary division of a request. This also allows the division processing to expand from division into two to variable division suited to the acceptable waiting time, thereby preventing an unnecessary increase in the number of divisions.

Figure 12:
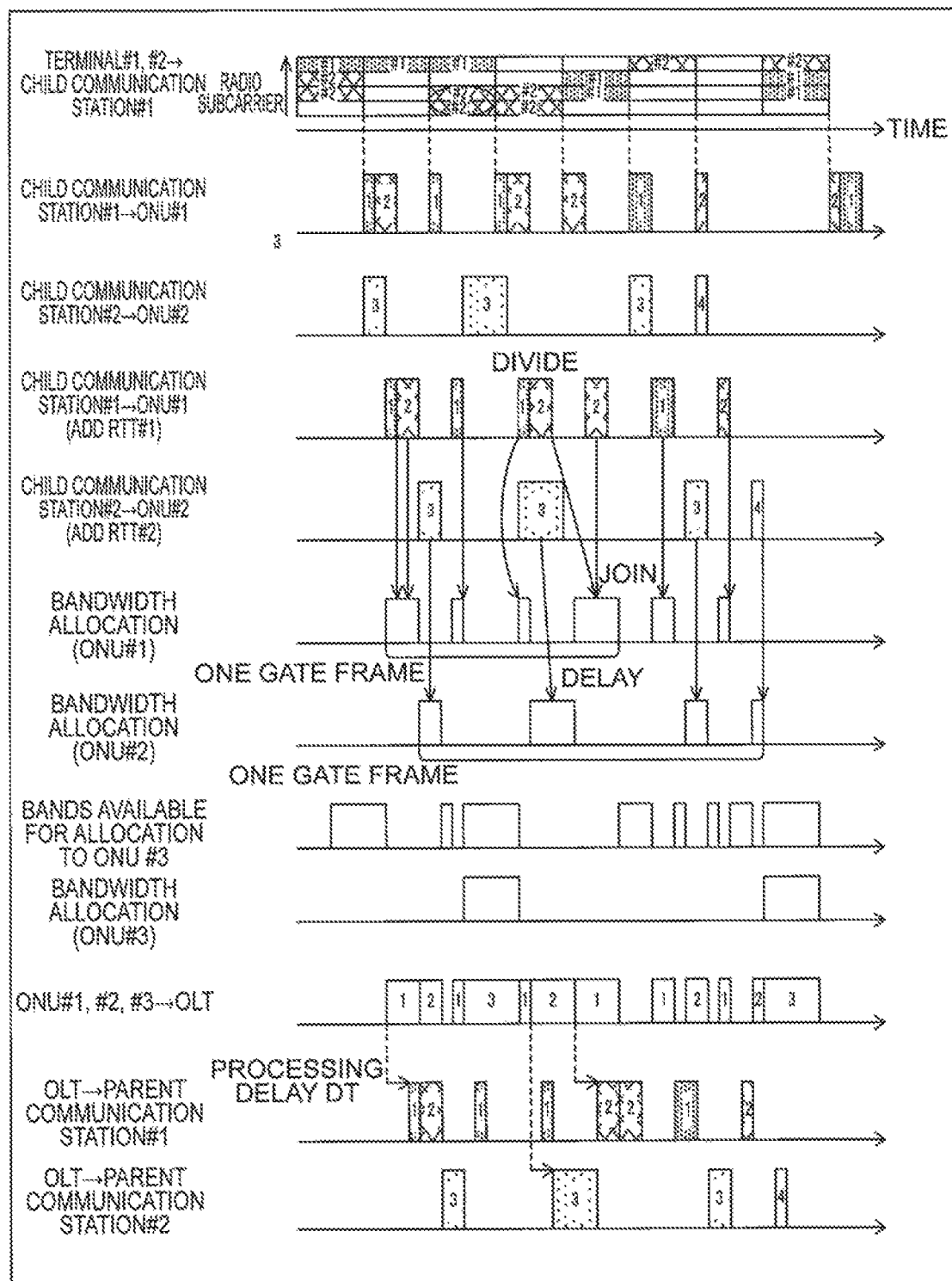
FIG. 12 is an example of an operation timing chart of terminals, child communication stations, ONUs, the OLT, and parent communication stations in the second embodiment of the present invention.

The band control unit 15 next allocates, as a grant to the ONU #3 (223), a suitable band for a time period in which the band is not occupied by the ONU #1 (221) and the ONU #2 (222). FIG. 12 is an operation timing chart of this OLT 1 and the ONUs #1 (221), #2 (222), and #3 (223). Processing of generating a gate frame from the allocated grant is the same as the one in FIG. 7.

The second embodiment has an advantageous effect in that no excessive bandwidth is allocated to real-time traffic, which varies in bandwidth, while non-real-time traffic can be allocated that much more bandwidth.

Another advantageous effect of the second embodiment is that the maximum delay amount of real-time traffic can be reduced to a delay less than the bandwidth allocation cycle.

The OLT in one embodiment of the present invention may take a mode in which uplink traffic occurrence information is obtained, other than the mode in which uplink scheduling information is obtained. For instance, in an optical network accommodating a mixture of a non-real-time traffic communication device and a gateway that transmits sensor information at a fixed time, the same processing of the OLT can be executed by providing the OLT in advance with traffic occurrence information, which includes the acceptable waiting time of sensor data, the sensor data transmission time, the sensor data amount, and the number of sensors. The same advantageous effects are consequently obtained for real-time traffic and non-real-time traffic.

In other words, according to one embodiment of the present invention, there is provided an optical line terminal for an optical network, which is configured to transmit to and receive from one or a plurality of optical network units (ONU) in a PON-type optical network, the optical line terminal including:

a transmission delay management unit 14 configured to manage, for each of the one or plurality of optical network units, a transmission delay time (RTT) in transmission to the optical network unit;

an uplink delay time management unit 16 configured to manage, for each of the one or plurality of optical network units, an acceptable waiting time (AWT) of uplink data of the optical network unit;

an uplink transmission time identification unit 17 configured to obtain, for each of the one or plurality of optical network units, an uplink transmission start time (ST) and data amount (OT) (REQ{ST, OT}) of the optical network unit, based on uplink assignment information (UAI), which is sent from outside; and a band control unit 15 configured to generate, for each of the one or plurality of optical network units, uplink transmission grant information (GT), which is made up of a time point (tGT) and time length (TGT) of uplink transmission to the optical network unit, wherein the band control unit 15 is configured to determine, for each of the one or plurality of optical network units, the uplink transmission grant information (GT) on transmission to the optical network unit, based on a transmission delay time (RTT) of the optical network unit, on the uplink transmission start time (ST) and data amount (OT) of the optical network unit, and on the acceptable waiting time (AWT) of uplink data of the optical network unit.

Further, the optical line terminal according to one embodiment of the present invention further includes a transmission request obtaining unit 18, which is configured to obtain an uplink transmission request data amount (Report) sent from each of the one or plurality of optical network units, wherein the band control unit 15 is configured to determine, for each of the one or plurality of optical network units, the uplink transmission grant information (GT) on transmission to the optical network unit, based on the transmission delay time (RTT) of the optical network unit, on a scheduled uplink transmission time (ST) and data amount (OT) of the optical network unit, on the acceptable waiting time (AWT) of uplink data of the optical network unit, and on the uplink transmission request data amount (Report).

The band control unit 15 is configured to variably set, for each of the one or plurality of optical network units, a number of pieces of uplink transmission grant information (GT) to be generated per unit time, based on the acceptable waiting time (AWT) of uplink data of the optical network unit.

The band control unit 15 is further configured to variably set the time length (TGT), which is an uplink transmission time (GT) of the uplink transmission grant information.

Further, according to one embodiment of the present invention, there is provided an optical line terminal for an optical communication system, the optical communication system including one or a plurality of child communication stations 211 and 212, parent communication stations 301 and 302, which are configured to perform uplink scheduling for the one or plurality of child communication stations, and a PON-type optical network, the PON-type optical network including one or a plurality of optical network units (OLT), which are interposed between the one or plurality of child communication stations 211 and 212 and the parent communication stations 301 and 302 and which are connected to the one or plurality of child communication stations, and the optical line terminal (ONU), which is configured to transmit to and receive from the one or plurality of optical network units and which is connected to the parent communication station, the optical line terminal including:

a transmission delay management unit 14 configured to manage, for each of the one or plurality of optical network units, a transmission delay time (RTT) in transmission to the optical network unit;

a child communication station uplink delay time management unit 16 configured to manage, for each of the one or plurality of child communication stations, an acceptable waiting time (AWT) of uplink data of the child communication station;

a child communication station uplink transmission time identification unit 17 configured to obtain, for each of the one or plurality of child communication stations, an uplink transmission start time (ST) and data amount (OT) (REQ{ST, OT}) of the child communication station; and a band control unit 15 configured to generate, for each of the one or plurality of optical network units, uplink transmission grant information (GT), which is made up of a time point (tGT) and time length (TGT) of uplink transmission to the optical network unit, wherein the child communication station uplink transmission time identification unit 17 is configured to calculate, for each of the one or plurality of child communication stations, the uplink transmission start time (ST) and data amount (OT) (REQ{ST, OT}) of the child communication station, by obtaining, from the parent communication stations, uplink assignment information (UAI) related to uplink scheduling, and wherein the band control unit 15 is configured to determine, for each of the one or plurality of optical network units, the uplink transmission grant information (GT) on transmission to the optical network unit, based on a transmission delay time (RTT) of the optical network unit, on the uplink transmission start time (ST) and data amount (OT) of each of the one or plurality of child communication stations, and on the acceptable waiting time (AWT) of uplink data of each of the one or plurality of child communication stations.

Further, the optical line terminal according to one embodiment of the present invention further includes a transmission request obtaining unit 18, which is configured to obtain an uplink transmission request data amount (Report) sent from each of the one or plurality of optical network units, wherein the band control unit 15 is configured to determine, for each of the one or plurality of optical network units, the uplink transmission grant information (GT) on transmission to the optical network unit, based on the transmission delay time (RTT) of the optical network unit, on a scheduled uplink transmission time (ST) and data amount (OT) of the child communication station, on the acceptable waiting time of uplink data of the child communication station, and on the uplink transmission request data amount (Report).

The band control unit 15 is configured to variably set, for each of the one or plurality of optical network units, a number of pieces of uplink transmission grant information (GT) to be generated per unit time, based on the acceptable waiting time (AWT) of uplink data of the child communication station.

The band control unit 15 is further configured to variably set the time length, which is an uplink transmission time (TGT) of the uplink transmission grant information (GT).

The optical line terminal according to one embodiment of the present invention further includes a time synchronization unit 19, which is configured to synchronize time with the parent communication stations, wherein the child communication station uplink transmission identification unit 17 is configured to calculate, for each of the one or plurality of child communication stations, the uplink transmission start time (ST) and data amount (OT) (REQ{ST, OT}) of the child communication station, from a time at which the synchronization with the parent communication stations is completed and from the uplink assignment information (UAI) obtained from the parent communication stations and related uplink scheduling.

INDUSTRIAL APPLICABILITY

The optical line terminals for the optical network and the optical communication system and the like according to one embodiment of the present invention are applicable to optical communication systems in various fields that use a PON-type optical network.

The invention claimed is:

1. An optical line terminal for an optical network, which is configured to transmit to and receive from one or a plurality of optical network units in a PON-type optical network, the optical line terminal comprising:
a processing circuitry
to manage, for each of the one or plurality of optical network units, a transmission delay time in transmission to the one or plurality of optical network units;
to manage, for each of the one or plurality of optical network units, an acceptable waiting time of uplink data of the one or plurality of optical network units;
to obtain, for each of the one or plurality of optical network units, an uplink transmission start time and data amount of the optical network unit, based on uplink assignment information, which is sent from a node different from the optical line terminal and the one or plurality of optical network units; and
to generate, for each of the one or plurality of optical network units, uplink transmission grant information, which is made up of a time point and time length of uplink transmission to the one or plurality of optical network units,
wherein the processing circuitry determines, for each of the one or plurality of optical network units, the uplink transmission grant information on transmission to the one or plurality of optical network units, based on a transmission delay time of the one or plurality of optical network units, on the uplink transmission start time and data amount of the one or plurality of optical network units, and on the acceptable waiting time of uplink data of the one or plurality of optical network units.

2. The optical line terminal for an optical network according to claim 1, wherein the processing circuitry further obtains an uplink transmission request data amount sent from each of the one or plurality of optical network units,
to determine, for each of the one or plurality of optical network units, the uplink transmission grant information on transmission to the one or plurality of optical network units, based on the transmission delay time of the one or plurality of optical network units, on a scheduled uplink transmission time and data amount of the one or plurality of optical network units, on the acceptable waiting time of uplink data of the one or plurality of optical network units, and on the uplink transmission request data amount.

3. The optical line terminal for an optical network according to claim 2, wherein the processing circuitry variably sets, for each of the one or plurality of optical network units, a number of pieces of uplink transmission grant information to be generated per unit time, based on the acceptable waiting time of uplink data of the one or plurality of optical network units.

4. The optical line terminal for an optical network according to claim 3, wherein the processing circuitry further variably sets the time length, which is an uplink transmission time of the uplink transmission grant information.

5. The optical line terminal for an optical network according to claim 1, wherein the processing circuitry variably sets, for each of the one or plurality of optical network units, a number of pieces of uplink transmission grant information to be generated per unit time, based on the acceptable waiting time of uplink data of the one or plurality of optical network units.

6. The optical line terminal for an optical network according to claim 5, wherein the processing circuitry further variably sets the time length, which is an uplink transmission time of the uplink transmission grant information.

7. An optical line terminal for an optical communication system, the optical communication system including:
one or a plurality of child communication stations;
parent communication stations, which are configured to perform uplink scheduling for the one or plurality of child communication stations; and
a PON-type optical network, the PON-type optical network including one or a plurality of optical network units, which are interposed between the one or plurality of child communication stations and the parent communication stations and which are connected to the one or plurality of child communication stations, and the optical line terminal, which is configured to transmit to and receive from the one or plurality of optical network units and which is connected to the parent communication stations,
the optical line terminal comprising:
a processing circuitry
to manage, for each of the one or plurality of optical network units, a transmission delay time in transmission to the one or plurality of optical network units;
to manage, for each of the one or plurality of child communication stations, an acceptable waiting time of uplink data of the one or plurality of child communication stations;
to obtain from the parent communication stations, for each of the one or plurality of child communication stations, an uplink transmission start time and data amount of the one or plurality of child communication stations; and
to generate, for each of the one or plurality of optical network units, uplink transmission grant information, which is made up of a time point and time length of uplink transmission to the one or plurality of optical network units,
wherein the processing circuitry calculates, for each of the one or plurality of child communication stations, the uplink transmission start time and data amount of the one or plurality of child communication stations, by obtaining, from the parent communication stations, uplink assignment information related to uplink scheduling, and
wherein the processing circuitry determines, for each of the one or plurality of optical network units, the uplink transmission grant information on transmission to the one or plurality of optical network units, based on a transmission delay time of the one or plurality of optical network units, on the uplink transmission start time and data amount of each of the one or plurality of child communication stations, and on the acceptable waiting time of uplink data of each of the one or plurality of child communication stations.

8. The optical line terminal for an optical communication system according to claim 7, wherein the processing circuitry further obtains an uplink transmission request data amount sent from each of the one or plurality of optical network units,
to determine, for each of the one or plurality of optical network units, the uplink transmission grant information on transmission to the one or plurality of optical network units, based on the transmission delay time of the one or plurality of child communication stations, on a scheduled uplink transmission time and data amount of the one or plurality of optical network units, on the acceptable waiting time of uplink data of the one or plurality of child communication stations, and on the uplink transmission request data amount.

9. The optical line terminal for an optical communication system according to claim 8, wherein the processing circuitry variably sets, for each of the one or plurality of optical network units, a number of pieces of uplink transmission grant information to be generated per unit time, based on the acceptable waiting time of uplink data of the one or plurality of child communication stations.

10. The optical line terminal for an optical communication system according to claim 8 wherein the processing circuitry further synchronizes time with the parent communication station,
to calculate, for each of the one or plurality of child communication stations, the uplink transmission start time and data amount of the one or plurality of child communication stations, from a time at which the synchronization with the parent communication station is completed and from the uplink assignment information obtained from the parent communication station and related uplink scheduling.

11. The optical line terminal for an optical communication system according to claim 9, wherein the processing circuitry further variably sets the time length, which is an uplink transmission time of the uplink transmission grant information.

12. The optical line terminal for an optical communication system according to claim 9 wherein the processing circuitry further synchronizes time with the parent communication station,
to calculate, for each of the one or plurality of child communication stations, the uplink transmission start time and data amount of the one or plurality of child communication station, from a time at which the synchronization with the parent communication stations is completed and from the uplink assignment information obtained from the parent communication station and related uplink scheduling.

13. The optical line terminal for an optical communication system according to claim 11 wherein the processing circuitry further synchronizes time with the parent communication station,
to calculate, for each of the one or plurality of child communication stations, the uplink transmission start time and data amount of the one or plurality of child communication stations, from a time at which the synchronization with the parent communication station is completed and from the uplink assignment information obtained from the parent communication station and related uplink scheduling.

14. The optical line terminal for an optical communication system according to claim 7, wherein the processing circuitry variably sets, for each of the one or plurality of optical network units, a number of pieces of uplink transmission grant information to be generated per unit time, based on the acceptable waiting time of uplink data of the one or plurality of child communication stations.

15. The optical line terminal for an optical communication system according to claim 14, wherein the processing circuitry further variably sets the time length, which is an uplink transmission time of the uplink transmission grant information.

16. The optical line terminal for an optical communication system according to claim 14 wherein the processing circuitry further synchronizes time with the parent communication station,
to calculate, for each of the one or plurality of child communication stations, the uplink transmission start time and data amount of the one or plurality of child communication stations, from a time at which the synchronization with the parent communication station is completed and from the uplink assignment information obtained from the parent communication station and related uplink scheduling.

17. The optical line terminal for an optical communication system according to claim 15 wherein the processing circuitry further synchronizes time with the parent communication station,
to calculate, for each of the one or plurality of child communication stations, the uplink transmission start time and data amount of the one or plurality of child communication stations, from a time at which the synchronization with the parent communication station is completed and from the uplink assignment information obtained from the parent communication station and related uplink scheduling.

18. The optical line terminal for an optical communication system according to claim 7 wherein the processing circuitry further synchronizes time with the parent communication station,
to calculate, for each of the one or plurality of child communication stations, the uplink transmission start time and data amount of the one or plurality of child communication stations, from a time at which the synchronization with the parent communication station is completed and from the uplink assignment information obtained from the parent communication station and related uplink scheduling.

19. An uplink scheduling method for an optical network to be used in an optical line terminal for the optical network, the optical line terminal being configured to transmit to and receive from the one or plurality of optical network units in a PON-type optical network, the uplink scheduling method comprising:
managing, for each of the one or plurality of optical network units, a transmission delay time in transmission to the one or plurality of optical network units;
managing, for each of the one or plurality of optical network units, an acceptable waiting time of uplink data of the one or plurality of optical network units;
obtaining, for each of the one or plurality of optical network units, an uplink transmission start time and data amount of the one or plurality of optical network units, based on uplink assignment information, which is sent from a node different from the optical line terminal and the one or plurality of optical network units;
and
generating, for each of the one or plurality of optical network units, uplink transmission grant information, which is made up of a time point and time length of uplink transmission to the one or plurality of optical network units,
wherein, when the uplink transmission grant information is generated for each of the one or plurality of optical network units, the uplink transmission grant information on transmission to the one or plurality of optical network units is determined based on a transmission delay time of the one or plurality of optical network units, on the uplink transmission start time and data amount of the one or plurality of optical network units, and on the acceptable waiting time of uplink data of the one or plurality of optical network units.

* * * * *